United States Patent
Sundberg

[15] 3,653,058
[45] Mar. 28, 1972

[54] APPARATUS FOR FREQUENCY STUDIES USING PUNCHED CARDS OR PUNCHED TAPES

[72] Inventor: Carl A. Sundberg, Kallhall, Sweden
[73] Assignee: AB Konsulterna For Industri Och Handel, Djursholm, Sweden
[22] Filed: May 4, 1970
[21] Appl. No.: 34,451

[30] Foreign Application Priority Data

May 5, 1969 Sweden..............................6295/69

[52] U.S. Cl. ..................346/17, 346/104, 35/48 R, 83/522
[51] Int. Cl. ..........................................G01d 1/00
[58] Field of Search..............346/17, 104; 83/522; 35/48 R, 35/5, 9 A

[56] References Cited

UNITED STATES PATENTS 3,208,160 9/1965 Smith.........................................35/5
3,550,492 12/1970 Bechhofer..............................83/50

Primary Examiner—Joseph W. Hartary
Attorney—Hane, Baxley and Spiecens

[57] ABSTRACT

An apparatus for performing frequency studies by employing punched cards includes a randomly occurring impulse generator wherein each impulse initiates an alerting signal. The alerting signal indicates to an operator that he should punch the card at a position indicated by the one of a plurality of lamps which is energized by a stepping device. When the operator punches the card, a circuit means terminates the alerting signal thereby ending the recording cycle.

8 Claims, 1 Drawing Figure

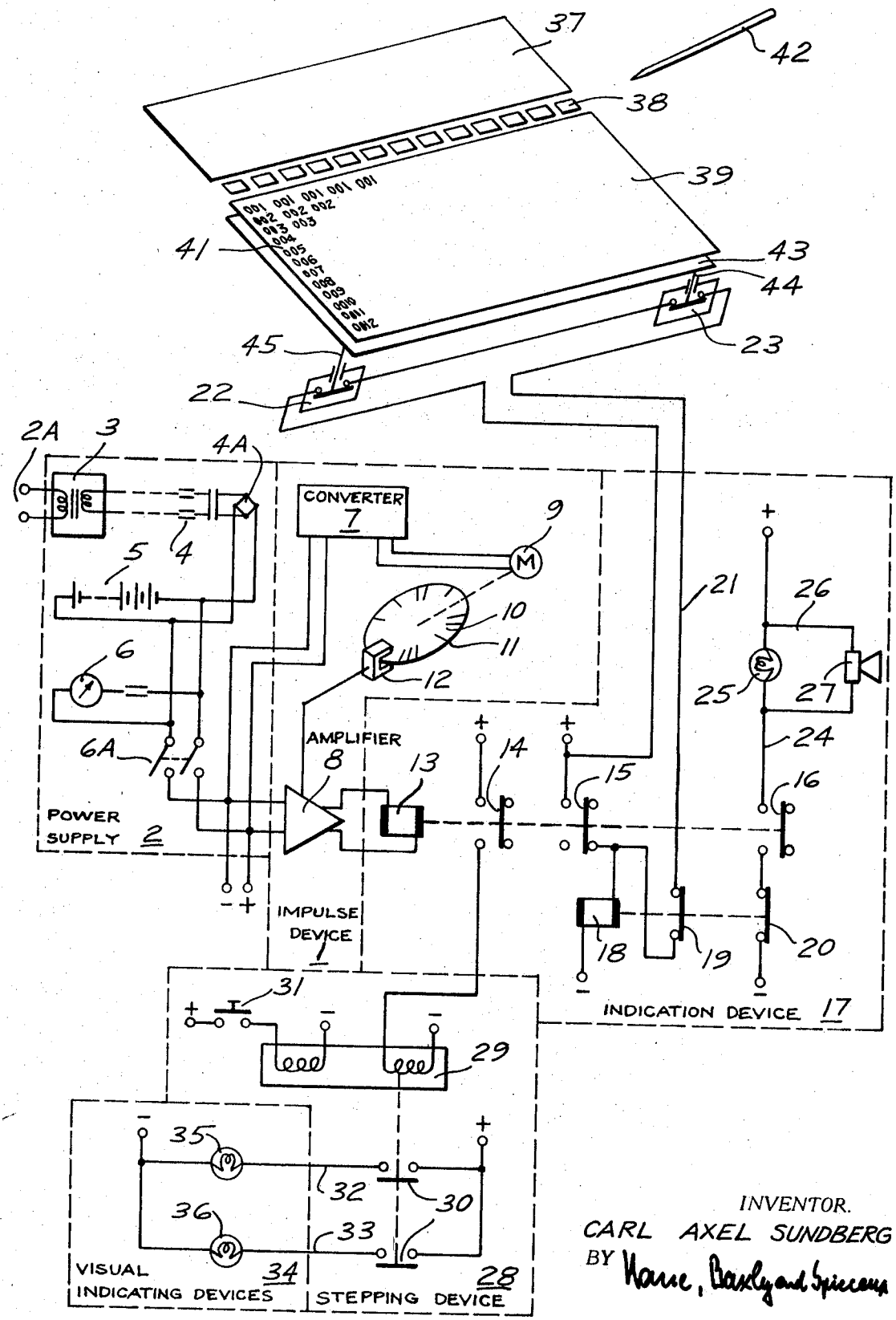

APPARATUS FOR FREQUENCY STUDIES USING PUNCHED CARDS OR PUNCHED TAPES

The present invention relates to apparatus for frequency studies by employing punched record media such as punched cards or punched tape which are marked at various times.

BACKGROUND

Frequency studies are used to obtain a basis for instance for judging the time distribution of various activities such as human actions and machinery operations. Having obtained such a basis it is then possible to plan or program such activities in the economically most favorable manner.

A frequency study is carried out by observing at random times, the activity of persons or machines and making a notation at the time of each observation. When a sufficient number of observations have been collected, the time distribution for a certain activity can be determined with great accuracy with the aid of mathematic equations and statistical analysis.

Heretofore, frequency studies have been carried out according to known methods by suitably trained personnel. According to one known method a number of data sufficient for frequency studies is collected by observation of certain personnel during a certain period of time. Such data can also be collected by requesting the personnel being monitored to submit a record of their own activities.

Continuous observation by trained job analysts is very costly compared with a frequency study. Moreover, the obtained record has the disadvantage that is relies entirely on the individual properly to make out the record. Because of the fallibility of human beings such records always have an inherent degree of uncertainty.

THE INVENTION

It is an object of the present invention to provide a novel and improved apparatus for obtaining a frequency study without requiring special observation personnel.

According to the present invention, a person undergoing the frequency study makes a record on a punched record medium at randomly chosen times without any possibility of influencing the frequency study. If the person under study should fail to make an indication on the record medium, or makes a mistake, such omission or mistake will immediately be noticed by the personnel who are in charge of processing the material from the frequency study.

Accordingly, the present invention makes it possible to carry out a frequency study without using special observation personnel. Consequently, not only a considerable economic saving but an improved accuracy are obtained.

SUMMARY OF THE INVENTION

Briefly, the invention contemplates frequency study by apparatus comprising an impulse device for randomly generating impulses which are utilized to initiate an alerting signal and to energize a stepping device. The stepping device actuates one of a number of visual indication members. The indication members, each on a job analysis card, indicate which one of several columns on a record medium the person being observed should mark. When the marking has been made, both the indication member and the alerting signal are switched off. The impulse device continues to run, and after a certain time a new impulse is emitted, a new alerting signal is obtained and at the same time a new visual indication member lights to indicate to the person being observed where the new marking is to be made.

Other objects, features and advantages of the invention will be apparent from the following detailed description in conjunction with the accompanying drawing the single FIGURE of which shows a preferred embodiment of the invention.

DETAILED DESCRIPTION OF THE INVENTION

In the drawing there is shown an impulse device 1 which is energized by power supply 2 connected via a connection contact 2A to electric mains (not shown). The connection contact 2A is connected (in power supply 2) to a transformer 3, which steps down the main voltage to about 24 volts. The secondary side of the transformer 3 is connected via a contact 4 to a bridge rectifier 4A. The output side of rectifier 4A is connected in parallel to a DC voltage source 5 and a voltmeter 6. DC voltage source 5 is a standby source which cuts in if the current from transformer 3 fails.

The output of power supply 2 is connected to a converter 7 and an amplifier 8 in impulse device 1. Converter 7 may be a well-known "chopper" which converts a DC voltage to a pulse train. The converter 7 is connected to a synchronous motor 9 which drives a disc 10. Between synchronous motor 9 and the shaft of the disc 10 a gear box may be arranged so that the disc 10 rotates, for instance, one revolution in 8 hours. The disc 10 may be a laminate, that is, the disc may be made of an insulating substrate coated with a metal foil, for instance, copper. Most of the foil has been etched away, so that radial, narrow strips 11 are obtained. The relative angular positions of the strips 11 may be fixed at random or as selected. At the periphery of the disc 10 a fork-shaped initiator 12 is arranged; the initiator may be of type SJ3.5 made by Pepperl & Fuchs. Initiator 12 is connected to amplifier 8 which, for instance, may be of the flip-flop type. An example of such an amplifier is type KH–R made by Pepperl & Fuchs. Alternately, disc 10 may be made of opaque material with transparent radial strips, and the initiator 12 may be a light source on one side of the disc and a photoelectric device on the other side of the disc. Each time a strip 11 passes initiator 12, the amplifier 8 emits an impulse.

The amplifier 8 is connected to a relay 13 having three contact sets 14, 15 and 16 which are shown in the deenergized state of the relay. The relay 13 is included in an indication device 17 further including a second relay 18 the coil of which receives current from the contact set 15 when relay 13 is energized. Relay 18 as two contact sets 19 and 20 which are shown in the operated state, i.e., when the relay 18 is energized. Contact set 19 is in a current circuit 21 which contains two normally closed contact sets 22 and 23. Current circuit 21 is also connected in parallel with contact set 15 and contact set 20 is in a current circuit 24 which includes the contact set 16 and a parallel circuit which includes a lamp 25 in one of its branches and in its other branch 26 an audible signal device 27.

A stepping device 28 is connected to impulse device 1. Current is fed to the electromagnetic part 29 of the stepping device 28 via contact set 14. The stepping device includes a plurality of contact sets 30, corresponding to the number of steps. The contact sets 30 are each, in turn, connected with visual indication devices 34. Only two contact sets in the step device 28 are shown in the drawing. Connection wires 32 and 33 for the visual indication devices 34 are each connected to lamps 35 and 36 respectively, in the visual indication devices 34. The electromagnetic part 29 also includes a device 31 for zero-setting of stepping device 28.

At the top of the figure, there is schematically shown a panel arrangement 37 including square compartments 38, each designating a field in which the previously mentioned lamps 35 and 36 of the visual indication members 34 are placed. The square compartments are covered with ground glass. If the stepping device has 10 steps there are 10 lamps and also 10 compartments 38, and in each compartment there is a lamp. The panel member 37 is made in such a way that there is space for accommodating a punch card 39 having a number of parallel columns; for instance, opposite each field there may be two parallel columns. There may, of course, be more columns opposite each field. Each column has markers 41 which may be perforated by means of a punching member of stylus 42. Below the punch card 39 a plate 43 is suspended, which by means of known devices assumes a predetermined rest position. By means of stylus 42, plate 43 can be moved downwardly during a perforation of the card. The bottom of the plate is connected via two pins 44 and 45 to contact sets 22 and 23. Each of the contact sets 22 and 23 may be a microswitch. When plate 43 is in its rest position, two contact sets 22 and 23 are in their closed positions. When the plate 43 is actuated (moved down) by a marking, circuit 21 is broken. Panel 37 is suitably contained in a housing which may include the entire apparatus.

The apparatus is turned on by closing a switch 6A. The motor 9 now starts, and via code disc 10, depending on the angular positions of the strips 11, impulses are fed at different times to relay 13. Each time the relay receives an impulse, the normally open contact set 16 closes and a light and sound signal are obtained from the lamp 25 and the audible device 27, respectively. At the same time, the normal-open contact 14 closes and the stepping device 28 moves one step thereby causing the lamp associated with this step to light up under the glass of the field compartments 38. At the same time as contact sets 14 and 15 close normally closed contact set 15 opens. However, relay 18 still receives current via circuit 21.

The person being monitored has thus received a light and sound signal, and now knows that he should mark the punch card 39. Since a lamp is lit under one of the field compartments 38, he also knows in which one of the columns he should place the mark. This is made at a marker 41 in the indicated column. As he perforates the card, he presses with his stylus 42 against the plate 43, and one or both of the normally closed contact sets 22 and 23 opens. As a result, the current feed to relay 18, via circuit 21, is interrupted, contact sets 19 and 20 open and the light and sound signals from lamp 25 and audible signal device 26 cease. The person being monitored can return to his ordinary work until a new signal comes from lamp 25 and device 27 when the next strip 11 passes initiator 12.

It is now evident that the impulse device may have any appropriate design, provided that it produces impulses at varying times. Another example of a design of an impulse device is to provide two oscillators, operating at markedly different frequencies, for instance, one of the frequencies may be 20 kHz. and the other may be a frequency between 10 and 0.01 Hz. The oscillators may be multivibrators and coact alternately with a shift register producing impulses at varying times. The stepping device is described as an electro-mechanical device but suitable electronic stepping devices without movable parts may be used instead.

While the invention has been described in detail with respect to a certain now preferred example and embodiment of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. Apparatus for use in frequency studies employing a punched record medium which is punched at different instants of time, said apparatus comprising in combination:
    means for supporting a punched record medium;
    visual indication members opposite different fields of the punched record medium;
    a randomly operating impulse device for generating impulses occurring at random times;
    a stepping device for selectively energizing said visual indication members to indicate which field is to be punched, said stepping device stepping one position upon receipt of an impulse to energize a different one of said visual indication members;
    means for generating an alerting signal, said alerting signal generating means being energized by each of said impulses;
    punch means operable by a subject to be monitored for punching an indicium in said punched record medium; and
    means responsive to the punching of an indicium in said punched record medium for de-energizing said alerting signal generating means.

2. The apparatus of claim 1 wherein said impulse device comprises a motor driven disc, a plurality of radially spaced indicia on said disc, and means for sensing each indicium on said disc when the indicium is at a particular angular position to generate a pulse signal.

3. The apparatus of claim 2 further comprising a relay means for receiving the pulse signals to generate the impulses to activate said stepping device.

4. The apparatus of claim 1 wherein the means responsive to the punching of an indicium comprises a movable plate below said punched record medium, and switch means operable by displacement of said movable plate in response to the punching of an indicium in said punched record medium.

5. The apparatus of claim 1 wherein said means for de-energizing said alerting signal generating means include switch means for interrupting a circuit to said alerting signal generating means.

6. The apparatus of claim 1 wherein said impulse device comprises two oscillators operating at substantially different frequencies, a shift register, and means for alternately connecting each of said oscillators to said shift register.

7. The apparatus of claim 1 wherein said stepping device comprises an electromechanical stepping switch.

8. The apparatus of claim 1 wherein said stepping device comprises an electronic stepping switch.

* * * * *